3,382,219
INHIBITING PRE-VULCANIZATION OF RUBBER WITH THIOAMINES OF PHENYLENEDIAMINE OR DIHYDROQUINOLINE
Chester D. Trivette, Jr., St. Albans, W. Va., assignor to Monsanto Company, St. Louis, Mo., a corporation of Delaware
No Drawing. Filed Jan. 10, 1966, Ser. No. 519,408
7 Claims. (Cl. 260—79.5)

This invention relates to new chemical compounds useful as premature vulcanization inhibitors in rubber. More particularly, the invention relates to the thioamine derivatives of an ortho, para, or meta phenylene diamine or 2,2,4 - trimethyl - 1,2 - dihydroquinoline or 6 - substituted 2,2,4 - trimethyl - 1,2 - dihydroquinolines.

An object of this invention is to provide new and useful chemical compounds for industry. A further object of this invention is to promote the progress of science and useful arts. Other objects will become apparent as the description proceeds.

The new compounds of this invention may be represented by the formulas

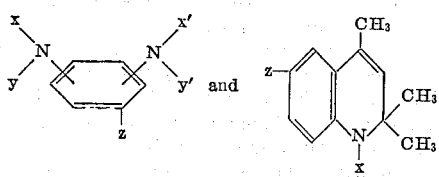

wherein each compound is the N - thio ortho, para, or meta phenylene diamine or 2,2,4 - trimethyl - 1,2 - dihydroquinoline or 6 - substituted 2,2,4 - trimethyl - 1,2-dihydroquinolines. The compounds are obtained by reacting a sulfenyl chloride of the formula RSCl with an ortho, para, or meta phenylene diamine of 2,2,4-trimethyl - 1,2 - dihydroquinoline or 6 - substituted 2,2,4-trimethyl - 1,2 - dihydroquinoline. The R of the sulfenyl chloride represents an alkyl, aryl, substituted aryl, aralkyl, or alicyclic group. In the formulas above, z may be alkoxy, aryloxy, aralkoxy, alkyl, aralkyl, hydrogen, halogen, aryl, substituted aryl, or alicyclic. The radicals represented by $x$ and $x'$ may be identical or different combinations of arylthio, substituted arylthio, aralkylthio, alkylthio, hydrogen, alicyclic, or alkyl, for example phenylthio, chlorophenylthio, tolylthio, benzylthio, nitrophenylthio, methylthio, ethylthio, propylthio, isopropylthio, tert. butylthio, and tert. butyl. However, either $x$ or $x'$ must have a sulfur atom present. The radicals represented by $y$ and $y'$ may be identical or different combinations of pyridin - 3 - yl, aryl, substituted aryl, aralkyl, alicyclic, alkyl, hydrogen, or alkoxyaryl, for example phenyl, cyclohexyl, tolyl, benzyl, methoxyphenyl, and tert. butyl. When $x$ and $y$ are taken together, they represent a substituted or unsubstituted morpholine ring. For the purposes of this invention, the terms "alkoxy" and "alkyl" include radicals having 1 to 20 carbon atoms of either straight or branched chains.

Suitable examples of the compounds of this invention are:

N - phenylthio - 2,2,4 - trimethyl - 1,2 - dihydroquinoline,
N - phenylthio - 6 - ethoxy - 2,2,4 - trimethyl - 1,2-dihydroquinoline,
N - phenylthio - 6 - methoxyethoxyethoxy - 2,2,4-trimethyl - 1,2 - dihydroquinoline,
N - phenylthio - 6 - dodecyl - 2,2,4 - trimethyl - 1,2-dihydroquinoline,
N - tert. butylthio - 2,2,4 - trimethyl - 1,2 - dihydroquinoline,
N - phenylthio - 6 - benzyloxy - 2,2,4 - trimethyl - 1,2-dihydroquinoline,
N - (p - chlorophenylthio) - 2,2,4 - trimethyl - 1,2-dihydroquinoline,
N - tolylthio - 2,2,4 - trimethyl - 1,2 - dihydroquinoline,
N - propylthio - 2,2,4 - trimethyl - 1,2 - dihydroquinoline,
N - (p - nitrophenylthio) - 2,2,4 - trimethyl - 1,2-dihydroquinoline,
N - phenylthio - 6 - phenyl - 2,2,4 - trimethyl - 1,2-dihydroquinoline,
N - tert.butylthio - 6 - benzyloxy - 2,2,4 - trimethyl-1,2 - dihydroquinoline,
N - phenylthio - N - (1 - methylheptyl) - p - morpholinoaniline,
N - phenylthio - N - (1 - methylheptyl) - p - (2,6-dimethylmorpholino) - aniline,
N - (p - chlorophenylthio) - N - isopropyl - p-morpholinoaniline,
N - (p - nitrophenylthio) - N - cyclohexyl - p-morpholinoaniline,
N - phenylthio - N - (3 - pyridinyl) - p - morpholinoaniline,
N - ethylthio - N - (p - methoxyphenyl) - p - morpholinoaniline,
N - (p - nitrophenylthio) - N - phenyl - p - morpholinoaniline,
N - (tert.butylthio) - N - phenyl - p - morpholinoaniline,
N - tolylthio - N - methyl - p - morpholinoaniline,
N - tolylthio - N - methyl - p - (2,6 - dimethylmorpholino)aniline,
N,N' - di(phenylthio) - N,N' - diphenyl - p - phenylene diamine,
N,N' - di(phenylthio) - N,N' - diphenyl - o - phenylene diamine,
N,N' - di(phenylthio) - N,N' - di(1 - methylheptyl) - p-phenylene diamine,
N,N' - di(phenylthio) - N,N' - di(1 - methylheptyl)-o-phenylene diamine,
N,N' - di(phenylthio) - N - cyclohexyl - N' - phenyl - p-phenylene diamine,
N,N' - di(phenylthio) - N - cyclohexyl - N' - phenyl - o-phenylene diamine,
N,N' - di(phenylthio) - N,N' - dicyclohexyl - m-phenylene diamine,
N,N' - di(phenylthio) - N - isopropyl - N' - tolyl - p-phenylene diamine,
N,N' - di(phenylthio) - N,N' - di(1,4 - dimethylamyl)-p - phenylene diamine
N - phenylthio - N,N' - di(1,4 - dimethylamyl) - p-phenylene diamine,
N,N' - di(phenylthio) - N - (1,3 - dimethylbutyl) - N'-phenyl - p - phenylene diamine,
N,N' - di(phenylthio) - N - (1,3 - dimethylbutyl) - N'-phenyl - o - phenylene diamine,
N,N' - di(phenylthio) - N,N' - di(1,3 - dimethyl butyl)-m - phenylene diamine,
N,N' - di(phenylthio) - N,N' - di(1,3 - dimethylbutyl)-p - phenylene diamine,
N,N' - di(p - chlorophenylthio) - N,N' - diphenyl - p-phenylene diamine,
N,N' - di(p - chlorophenylthio) - N - isopropyl - N'-methoxyphenyl) - p - phenylene diamine,
N,N' - di(p - chlorophenylthio) - N - isopropyl - N'-(3 - pyridinyl) - p - phenylene diamine,
N,N' - di(p - nitrophenylthio) - N,N' - diphenyl - p-phenylene diamine,
N,N' - di(o - nitrophenylthio) - N - 1,3 - dimethylbutyl-N' - phenyl - p - phenylene diamine,
N,N' - di(tert.butylthio) - N,N' - diphenyl - p-phenylene diamine, N,N' - di(tert.butylthio) - N - 1,3 - dimethylbutyl - N'-phenyl - p - phenylene diamine,
N,N' - di(tert.butylthio) - N,N' - di(1,4 - dimethylamyl)- p - phenylene diamine,
N,N' - di(ethylthio) - N,N' - dicyclohexyl - p - phenylene diamine,
N - methylthio - N,N' - diisopropyl - p - phenylene diamine,
N,N' - di(tolylthio) - N,N' - diphenyl - p - phenylene diamine,
N,N' - di(tolylthio) - N - 1,3 - dimethylbutyl - N'-phenyl - p - phenylene diamine,
N,N' - di(tolylthio) - N,N' - di(1,4 - dimethylamyl) - p-phenylene diamine,
N,N' - diphenyl - N - phenylthio - p - phenylene diamine,
N,N' - di(1,4 - dimethylamyl) - N - phenylthio - p-phenylene diamine,
N,N' - diphenyl - N - methyl - N' - phenylthio - p-phenylene diamine,
N,N' - diphenyl - N - methyl - N' - isopropylthio - p-phenylene diamine,
N - methyl - N - phenyl - N' - isopropyl - N' - phenylthio-p - phenylene diamine,
N,N' - diethyl - N' - phenylthio - N' - (1 - methylpropyl)-p - phenylene diamine, and
N,N' - di(phenylthio) - N,N' - di(1,3 - dimethylbutyl)-methoxy - p - phenylene diamine.

The compound N,N' - di(phenylthio) - N,N' - di(1,4-dimethylamyl)-p-phenylene diamine is an example of the phenylene diamine derivatives of this invention and has the formula

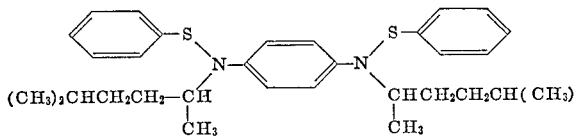

The compound N - phenylthio - 6 - ethoxy - 2,2,4 - trimethyl - 1,2 - dihydroquinoline is an example of the dihydroquinoline derivatives of this invention and has the formula

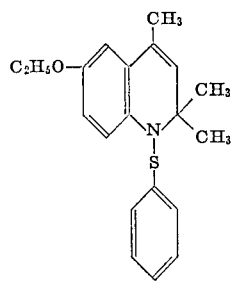

To prepare N,N'-di(phenylthio) - N - (1,3-dimethylbutyl)N'-phenyl-p-phenylene diamine, 0.1 mole of benzene-sulfenyl chloride dissolved in carbon tetrachloride is added over a period of 15 minutes to a mixture of 13.4 grams (0.05 mole) of N-1,3-dimethylbutyl-N'-phenyl-p-phenylene diamine, 12.5 grams (0.125 mole) triethylamine and 100 ml. benzene cooled to —5° C. and maintained at —5° C. to 0° C. during the reaction. The reaction mixture is stirred at 0° C. an additional 20 minutes. The triethylamine hydrochloride which forms forms during the reaction is filtered off, and the solvents are removed from the filtrate on a rotary evaporator. The residue weighs 29.6 grams. Iodometric titration gives an assay of 80% of the disubstituted product. The infrared spectrum of the product shows that the N-H absorption band for N-1,3-dimethyl-butyl-N'-phenyl-p-phenylene diamine, located at 2.93 microns, has disappeared, indicating that reaction occurred at the nitrogen atom. The remaining phenylene diamine derivatives of this invention are prepared in a similar manner with comparable results.

To prepare N-phenylthio-6-ethoxy-2,2,4-trimethyl-1,2- dihydroquinoline, 57 grams of a solution containing 25.4% benzene sulfenyl chloride in carbon tetrachloride is added to a mixture of 21.7 grams (0.1 mole) of 6-ethoxy-2,2,4-trimethyl-1,2-dihydroquinoline, 12.5 grams (0.125 mole) of triethylamine, and 150 ml. of benzene. The solution is added over a period of ten minutes with stirring at 20°–25° C. Cooling is provided by an external ice bath. The reaction mixture is stirred for ten minutes after the addition of the sulfenyl chloride is complete. The triethylamine hydrochloride which forms during the reaction is then removed by filtration, and the solvents are removed from the filtrate on a rotary evaporator. The residue, containing primarily N-phenylthio-6-ethoxy-2,2,4-trimethyl-1,2-dihydroquinoline, weighs 33 grams. Iodometric titration gives an assay of 71% of the product. The infrared spectrum of the product shows that the N-H absorption band for 6-ethoxy-2,2,4-trimethyl-1,2-dihydroquinoline, located at 3.0 microns, has disappeared, indicating that the reaction occurred at the nitrogen atom. The remaining dihydroquinoline derivatives of this invention are prepared in a similar manner with comparable results.

The compounds of this invention are useful as premature vulcanization inhibitors for diene rubbers. In the manufacture of vulcanized rubber products, crude rubber is combined with various other ingredients such as fillers, accelerators, and antidegradants to alter or improve processing of rubber and to improve the properties of the final product. The crude rubber is put through several steps in the factory before it is ready for the final step of vulcanization. Generally, the rubber is mixed with carbon black and other ingredients except the vulcanizing agent and accelerator. Then the vulcanizing and accelerating agents are added to this masterbatch in a Banbury mixer or on a mill. Scorching, viz., premature vulcanization, can occur at this stage of the processing, during the storage period before vulcanizing, and during the actual vulcanization. After the vulcanizing and accelerating agents are added, the mixture of crude rubber is ready for calendaring or extruding and vulcanization. If premature vulcanization occurs during the storage of the crude mixture or during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized. In addition to the premature vulcanization inhibitor properties of the compounds of this invention, most of the compounds are useful antidegradants in rubber.

There are several reasons offered for premature vulcanization. The discovery of the thiazolesulfenamide accelerators constituted a major breakthrough in the vulcanization art because thiazole sulfenamides delayed onset of the vulcanizing process; but once it started, the built-in amine activation of the thiazole resulted in strong, rapid curing. Mercaptobenzothiazole is a valuable organic vulcanization accelerator but by present standards would be considered scorchy. It has been largely replaced by the delayed-action accelerators, but further improvement has eluded the art. The development of high pH furnace blacks which lack the inherent inhibiting effect of the acidic channel blacks and the popularity of certain phenylene diamine antidegradants which promote scorching have placed increasingly stringent demands on the accelerator system.

The following tables illustrate the utility of the compounds of this invention but are not to be construed as to narrow the scope of the invention. For the rubber stocks tested and described below, Mooney scorch times at 121° C. and 135° C. are determined by means of a Mooney plastometer. The time in minutes ($t_5$) required for the Mooney reading to rise five points above the minimum viscosity is recorded. Longer times indicate the activity of the inhibitor. Longer times on the Mooney scorch test are desirable because this indicates greater processing safety.

The trademarks of some compounds used in the following tables are Santocure MOR, Santocure NS, and Santoflex 77. Santocure MOR is the vulcanization accelerator 2-(morpholinothio)benzothiazole. Santocure NS is the accelerator N-tert.-butyl-benzothiazole - 2 - sulfenamide. Santoflex 77 is the antidegradant N,N'-bis(1,4-dimethylamyl)p-phenylene diamine.

The rubber mixture for the tests reported in the tables I through IV below is an A–6 masterbatch. An A–6 masterbatch is comprised of the following:

| | Parts |
|---|---|
| Natural rubber smoked sheets | 100 |
| High abrasion furnace black | 50 |
| Zinc oxide | 5 |
| Stearic acid | 3 |
| Hydrocarbon softener | 10 |
| Total parts | 168 |

Table I illustrates the utility of the compounds N,N'-di-(phenylthio)-N,N'-di(1,4-dimethylamyl) - p - phenylene diamine and N,N'-di(phenylthio)-N-(1,3-dimethylbutyl)-N'-phenyl-p-phenylene diamine in an A–6 masterbatch. Stock 1 is a blank containing the accelerator Santocure NS alone.

TABLE I

| Stock | 1 | 2 | 3 | 4 | 5 | 6 | 7 | 8 | 9 | 10 | 11 | 12 |
|---|---|---|---|---|---|---|---|---|---|---|---|---|
| A–6 Masterbatch | 168.0 | 168.0 | 168.0 | 168.0 | 168.0 | 168.0 | 168.0 | 168.0 | 168.0 | 168.0 | 168.0 | 168.0 |
| Sulfur | 2.5 | 2.5 | 2.5 | 2.5 | 2.5 | 2.5 | 2.5 | 2.5 | 2.5 | 2.5 | 2.5 | 2.5 |
| Santocure NS | 0.5 | 0.5 | 0.5 | 0.5 | 0.5 | 0.5 | 0.5 | 0.5 | 0.5 | 0.5 | 0.5 | 0.5 |
| N,N'-di (phenylthio)-N,N'-di (1,4-dimethyl amyl)-p-phenylene diamine | 0.0 | 0.0 | 0.5 | 1.0 | 2.0 | 3.0 | 0.0 | 0.0 | 0.0 | 0.0 | 0.5 | 0.0 |
| N,N'-di (phenylthio)-N-(1,3-dimethylbutyl)-N'phenyl-p-phenylene diamine | 0.0 | 0.0 | 0.0 | 0.0 | 0.0 | 0.0 | 0.5 | 1.0 | 2.0 | 3.0 | 0.0 | 0.5 |
| Santoflex 77 | 0.0 | 3.0 | 2.5 | 2.0 | 1.0 | 0.0 | 2.5 | 2.0 | 1.0 | 0.0 | 0.0 | 0.0 |
| Mooney Scorch at 121° C., $t_5$ (min.) | 44.5 | 24.3 | 29.8 | 34.1 | 47.8 | 70.5 | 27.8 | 34.7 | 48.7 | 79.6 | 53.7 | 52.5 |

Table I illustrates that a decrease in the concentration of the antidegradant Santoflex 77 with a corresponding increase in the concentration of the compounds of this invention improves the scorch delay and processing safety of the stocks. And ozone resistance tests show that the compounds of this invention used in Table I are antidegradants.

In a styrene-butadiene rubber masterbatch containing 1.75 parts sulfur and one part Santocure MOR, the Mooney Scorch $t_5$ at 135° C. is 52.9 mins. with the addition of 0.50 part N,N'-di-(phenylthio)-N-(1,3-dimethylbutyl)-N'-phenyl-p-phenylene diamine, $t_5$ increases to 58.3 mins. Ozone resistance tests show that this compound is an antidegradant for styrene-butadiene rubber.

The results in Table II are obtained using an A–6 masterbatch and similar tests as shown in Table I except 0.5 parts Santocure MOR is used as the accelerator in each stock in place of Santocure NS and the inhibitors and antidegradants are different. Two parts antidegradant alone or inhibitor alone is used in the stocks.

TABLE II

Mooney Scorch at 121° C.
Antidegradant, inhibitor: $t_5$ (mins.)
N,N'-diphenyl-p-phenylene diamine _____ 45.0
N,N'-di(phenylthio)-N,N'-diphenyl - p-phenylene diamine _____ 65.7
N,N' - di(1 - methylheptyl) - p - phenylene diamine _____ 24.7
N,N' - di(phenylthio) - N,N' - di(1-methylheptyl)-p-phenylene diamine _____ 58.4
N-p-tolyl-N'-isopropyl-p-phenylene diamine __ 33.2
N,N' - di(phenylthio) - N - isopropyl-N'-tolyl-p-phenylene diamine _____ 83.0
N-isopropyl-p-morpholinoaniline _____ 30.0
N - (p - chlorophenylthio) - N - isopropyl - p-morpholinoaniline _____ 48.0

N - isopropyl - N' - (3 - pyridinyl)-p-phenylene diamine _____ 17.3
N,N' - di(p - chlorophenylthio) - N - isopropyl-N'-(3-pyridinyl)-p-phenylene diamine _____ 52.2
N - isopropyl - N' - methoxyphenyl - p - phenylene diamine _____ 21.4
N,N' - di(p - chlorophenylthio) - N - isopropyl-N'-methoxyphenyl-p-phenylene diamine ___ 64.5
N,N' - di(1,4 - dimethylamyl) - p - phenylene diamine _____ 26.7
N,N' - di(phenylthio) - N,N'-di-(1,3-dimethylbutyl)-o-methoxy-p-phenylene diamine ____ 46.3

The results in Table III are obtained using an A–6 masterbatch and similar tests as shown in Table I except 0.5 part MOR is used as the accelerator in each stock in place of Santocure NS and the inhibitors and antidegradants are different. Two parts antidegradant alone or inhibitor alone is is used in the stocks.

TABLE III

Mooney Scorch at 121° C.
Antidegradant, inhibitor: $t_5$ (mins.)
N-cyclohexyl-N'-phenyl-p-phenylene diamine _ 35.7
N,N' - di(phenylthio) - N - cyclohexyl - N'-phenyl-p-phenylene diamine _____ 80.5
N - methyl - N - phenyl-N'-isopropyl-p-phenylene diamine _____ 35.4

TABLE III—Continued

Mooney Scorch at 121° C.
Antidegradant, inhibitor: $t_5$ (mins.)
N - methyl - N - phenyl - N' - isopropyl - N'-phenylthio-p-phenylene diamine _____ 69.9
N,N'-dicyclohexyl-m-phenylene diamine _____ 38.2
N,N' - di(phenylthio) - N,N' - dicyclohexyl-m-phenylene diamine _____ 46.3
N,N - diethyl - N' - (1-methylpropyl)-p-phenylene diamine _____ 13.9
N,N - diethyl - N' - phenylthio - N' - (1-methylpropyl)-p-phenylene diamine _____ 20.3
6 - ethoxy - 2,2,4-trimethyl - 1,2 - dihydroquinoline _____ 50.9
N - phenylthio - 6 - ethoxy - 2,2,4 - trimethyl-1,2-dihydroquinoline _____ 58.7

The results in Table IV further illustrate the utility of the premature vulcanization inhibitors of this invention. The results are obtained using an A–6 masterbatch and similar tests as shown in Table I except 0.5 part Santocure MOR is used as the accelerator in each stock in place of Santocure NS and the inhibitors and antidegradants are different. Two parts antidegradant alone or inhibitor alone is used in the stocks.

TABLE IV

Mooney Scorch at 121° C.
Antidegradant, inhibitor: $t_5$ (mins.)
N,N'-di(1,3-dimethylbutyl)-m-phenylene diamine _____ 22.0
N,N'-di(phenylthio)-N,N'di - (1,3 - dimethylbutyl)-m-phenylene diamine _____ 33.2
N-1,3-dimethylbutyl-N'-phenyl-p-phenylene diamine _____ 42.7
N,N'-di(o-nitrophenylthio) - N - 1,3 - dimethylbutyl-N'-phenyl-p-phenylene diamine _____ 44.6

TABLE IV—Continued

Mooney Scorch at 121° C.

| Antidegradant, inhibitor: | $t_5$ (mins.) |
|---|---|
| N,N'-di(1,4-dimethylamyl) - p - phenylene diamine | 25.3 |
| N,N' - di(tolylthio) - N,N' - di(1,4 - dimethyllauryl)-p-phenylene diamine | 59.2 |
| N,N'-di(tolylthio)-N - 1,3 - dimethylbutyl - N'-phenyl-p-phenylene diamine | 70.2 |

The rubber mixture for the tests reported in the tables V and VI is a natural rubber masterbatch comprised of the following:

| | Parts |
|---|---|
| Natural rubber smoked sheets | 100 |
| Intermediate super abrasion furnace black | 45 |
| Hydrocarbon softener | 5 |
| Zinc oxide | 3.0 |
| Stearic acid | 2.0 |
| Sulfur | 2.5 |
| Total parts | 157.5 |

Each stock in Tables V and VI contains 157.5 parts of this rubber masterbach.

TABLE V

| Stock | 1 | 2 | 3 | 4 | 5 |
|---|---|---|---|---|---|
| Santocure MOR | 0.5 | 0.5 | 0.5 | 0.5 | 0.5 |
| N-phenylthio-6-phenyl-2,2,4-trimethyl-1,2-dihydroquinoline | | 2.0 | | | |
| N-phenylthio-2,2,4-trimethyl-1,2-dihydroquinoline | | | 2.0 | | |
| N-(p-chlorophenylthio)-2,2,4-trimethyl-1,2-dihydroquinoline | | | | 2.0 | |
| N-tert.-butylthio-2,2,4-trimethyl-1,2-dihydroquinoline | | | | | 2.0 |
| Mooney Scorch at 121° C. $t_5$ (mins.) | 42.4 | 63.9 | 80.5 | 76.0 | 51.4 |

TABLE VI

| Stock | 1 | 2 | 3 | 4 | 5 |
|---|---|---|---|---|---|
| Santocure MOR | 0.5 | 0.5 | 0.5 | 0.5 | 0.5 |
| N-phenylthio-6-benzyloxy-2,2,4-trimethyl-1,2-dihydroquinoline | | 2.0 | | | |
| N-phenylthio-6-dodecyl-2,2,4-trimethyl-1,2-dihydroquinoline | | | 2.0 | | |
| N-phenylthio-6-methoxy-ethoxyethoxy-2,2,4-trimethyl-1,2-dihydroquinoline | | | | 2.0 | |
| N-tert.butyl-6-benzyloxy-2,2,4-trimethyl-1,2-dihydroquinoline | | | | | 2.0 |
| Mooney Scorch at 121° C. $t_5$ (mins.) | 44.0 | 64.7 | 62.2 | 56.3 | 48.5 |

Comparable results to those in the tables, supra, are obtained when the remaining compounds of this invention are tested as premature vulcanization inhibitors. The inhibitors of this invention can be used with organic vulcanization accelerators in natural and synthetic rubbers. Synthetic rubbers that can be improved using the method of this invention include cis-4-polybutadiene, butyl rubber, ethylene-propylene terpolymers, polymers of 1,3-butadiene, for example 1,3-butadiene itself and of isoprene and copolymers of 1,3-butadiene with other monomers, for example, styrene, acrylonitrile, isobutylene and methyl methacrylate.

Concentration studies show the compounds of this invention are effective inhibitors and antidegradants in rubber at concentrations of 0.05 to 10.0 parts per hundred. Concentrations from 0.25 to 3.0 parts per hundred are preferred.

It is intended to cover all changes and modifications of the examples of the invention herein chosen for purposes of disclosure which do not constitute departures from the spirit and scope of the invention.

I claim:
1. The method of inhibiting premature vulcanization of a vulcanizable diene rubber containing a vulcanizing agent and an organic vulcanization accelerating agent which comprises
incorporating therein in an amount effective to inhibit premature vulcanization phenylene diamine or dihydroquinoline compounds, respectively of the formula

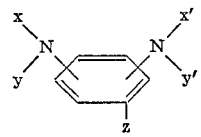

or

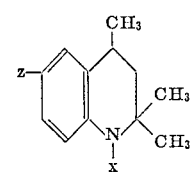

wherein $x$ and $x'$, at least one of which contains sulfur in the phenylene diamine compound and $x$ contains sulfur in the dihydroquinoline compound, are arylthio, alkyl-, chloro- and nitro-substituted arylthio cycloalkylthio, alkylthio, aralkylthio, hydrogen, alicyclic, or alkyl;

$x$ and $y$ in the phenylene diamine compound taken together are morpholino or 2,6-dialkylmorpholino;

$y$ and $y'$ in the phenylene diamine compound are hydrogen, aryl, alkyl-, chloro- and nitro-substituted aryl, aralkyl, alkyl, alicyclic, pyridin-3-yl, or alkoxyaryl; and $z$ is hydrogen, halogen, alkoxy, aryloxy, aralkoxy, alkyl, aralkyl, aryl, alkyl-, chloro- and nitro-substituted aryl, or alicyclic.

2. The method of inhibiting premature vulcanization of rubber as described in claim 1 wherein an effective amount of antidegradant is incorporated therein.

3. The method of inhibiting premature vulcanization of rubber as described in claim 1 wherein the premature vulcanization inhibitor is N,N'-di(phenylthio)-N,N'-di(1,4-dimethylamyl)-p-phenylene diamine.

4. The method of inhibiting premature vulcanization or rubber as described in claim 1 wherein the premature vulcanization inhibitor is N,N'-di(phenylthio)-N-(1,3-dimethylbutyl-N'-phenyl-p-phenylene diamine.

5. The method of inhibiting premature vulcanization of rubber as described in claim 1 wherein the premature vulcanization inhibitor is N-(p-chlorophenylthio)-N-isopropyl-p-morpholinoaniline.

6. The method of inhibiting premature vulcanization of rubber as described in claim 1 wherein the premature vulcanization inhibitor is N-phenylthio - 6 - ethoxy-2,2,4-trimethyl-1,2-dihydroquinoline.

7. The method of inhibiting premature vulcanization of rubber as described in claim 1 wherein the premature vulcanization inhibitor is N-phenylthio-2,2,4-trimethyl-1,2-dihydroquinoline.

References Cited

UNITED STATES PATENTS

| 2,988,540 | 6/1961 | Kibler | 260—283 |
| 3,024,217 | 3/1962 | Kibler | 260—800 |
| 3,047,546 | 7/1962 | Lober | 260—79.5 |

JOSEPH L. SCHOFER, Primary Examiner.

D. K. DENENBERG, Assistant Examiner.